US005836552A

United States Patent [19]

Yu

[11] Patent Number: 5,836,552

[45] Date of Patent: Nov. 17, 1998

[54] MUSICAL INSTRUMENT STAND

[76] Inventor: Ming-Ti Yu, 122-5, Jun Liao Road, Feng Yuan, Taichung Shien, Taiwan

[21] Appl. No.: 998,570

[22] Filed: Dec. 28, 1997

[51] Int. Cl.[6] ........................ F16M 11/38

[52] U.S. Cl. .................. 248/166; 84/327; 248/443

[58] Field of Search .................. 248/166, 443, 248/450, 150; 84/327

[56] References Cited

U.S. PATENT DOCUMENTS 5,713,547 2/1998 Yu ........................ 248/166
5,744,735 4/1998 Liao ........................ 248/460 X

*Primary Examiner*—Ramon O. Ramirez

[57] ABSTRACT

A musical instrument stand has a first hollow plate, a second hollow plate, a first base rod, a second base rod, an adjustment knob, a balance seat, an annular cushion, a screw rod, and a swivel knob. A lug is disposed on the first base rod to receive the balance seat. A lower end of the first hollow plate is inserted in the balance seat. A positioning bolt fastens the adjustment knob and the balance seat together. A screw fastens the lug and the balance seat together. The second hollow plate is disposed on the second base rod. A first undulated bracket is disposed on the first hollow plate. A second undulated bracket is disposed on the second hollow plate. The first hollow plate has an upper lobe end which has a slot and a through hole. The second hollow plate has an upper disk end which has a center hole and a periphery flange. The upper disk end is inserted in the slot. A screw rod is inserted through the through hole, the center hole, and the swivel knob.

4 Claims, 6 Drawing Sheets

MUSICAL INSTRUMENT STAND

BACKGROUND OF THE INVENTION

The invention relates to a musical instrument stand. More particularly, the invention relates to a musical instrument stand which can be easily detached.

Referring to FIG. 6, a conventional musical instrument stand comprises a joint 5, an upper rod 6 disposed on top of the joint 5, a first and second hollow plates 31' and 32' connected to the joint 5, the first hollow plate 31' disposed on a first base rod 21', the second hollow plate 32' disposed on a second base rod 22', a first undulated bracket 41' is disposed on the first hollow plate 31'. A second undulated bracket 42' is disposed on the second hollow plate 32'. However, the whole musical instrument stand becomes too large after it is assembled.

SUMMARY OF THE INVENTION

An object of the invention is to provide a musical instrument stand which is easily folded.

Another object of the invention is to provide a musical instrument stand which can lower the center of gravity of the musical instrument while the musical instrument is rested on the musical instrument stand.

Accordingly, a musical instrument stand comprises a first hollow plate, a second hollow plate, a first base rod, a second base rod, an adjustment knob, a balance seat, an annular cushion, a screw rod, and a swivel knob. A lug is disposed on the first base rod. The lug has a round hole and an oblong hole. The balance seat has a lateral post, a channel receiving the lug, a groove receiving a lower end of the first hollow plate, a first through aperture matching the oblong hole, and a second through aperture matching the round hole. A positioning bolt passes through the first through aperture and the oblong hole to fasten the adjustment knob and the balance seat together. A screw passes through the second through aperture and the round hole to fasten the lug and the balance seat together. The second hollow plate is disposed on the second base rod. A first undulated bracket is disposed on the first hollow plate. A second undulated bracket is disposed on the second hollow plate. The first hollow plate has an upper lobe end. The upper lobe end has a slot and a through hole. The second hollow plate has an upper disk end. The upper disk end has a center hole and a periphery flange. The upper disk end is inserted in the slot. A screw rod has a head portion and a threaded portion inserted through the through hole, the center hole, and the swivel knob.

DETAILED DESCRIPTION OF THE INVENTION

Figure 1:
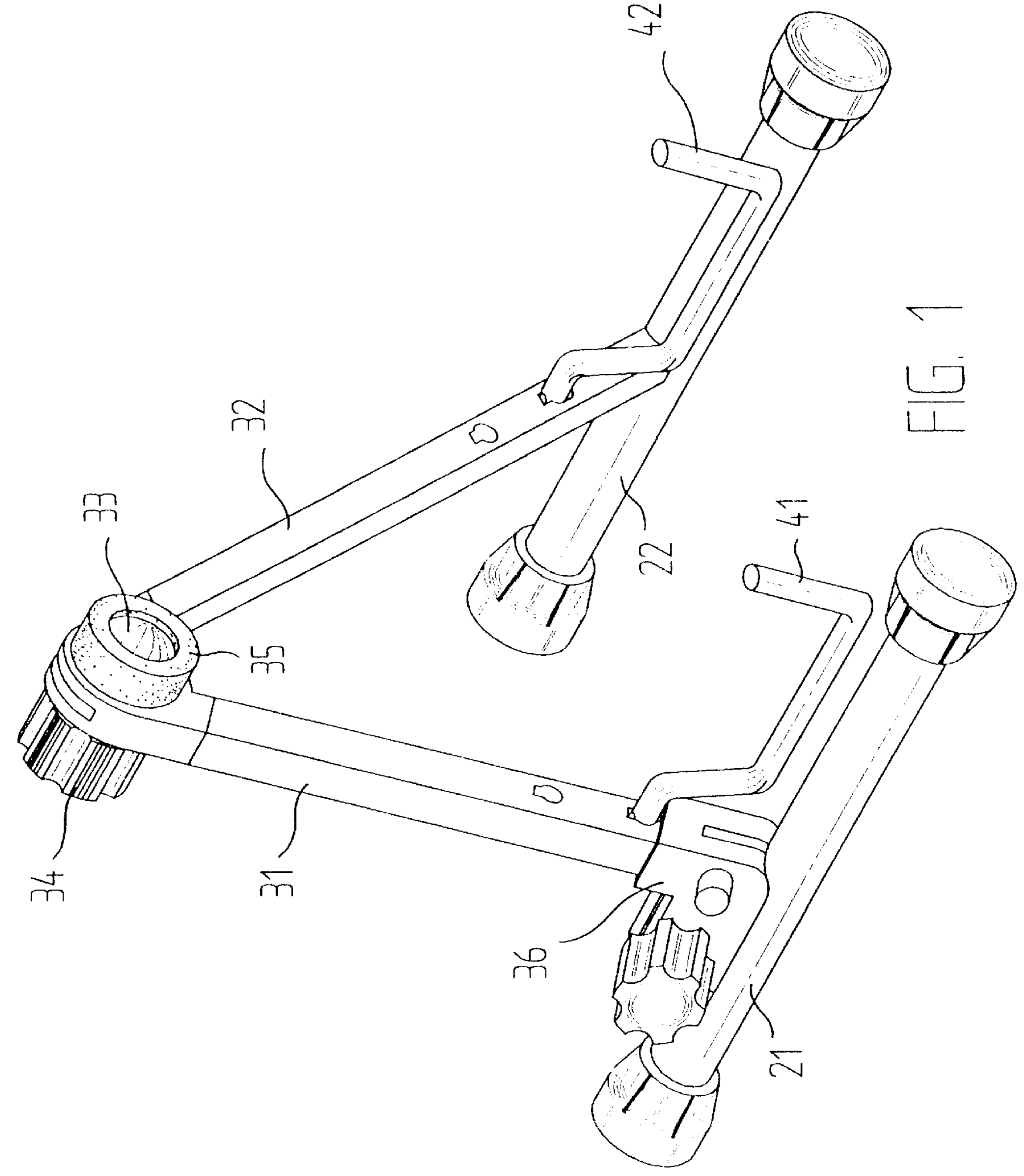
FIG. 1 is a perspective assembly view of a musical instrument stand of a preferred embodiment in accordance with the invention.
Figure 2:
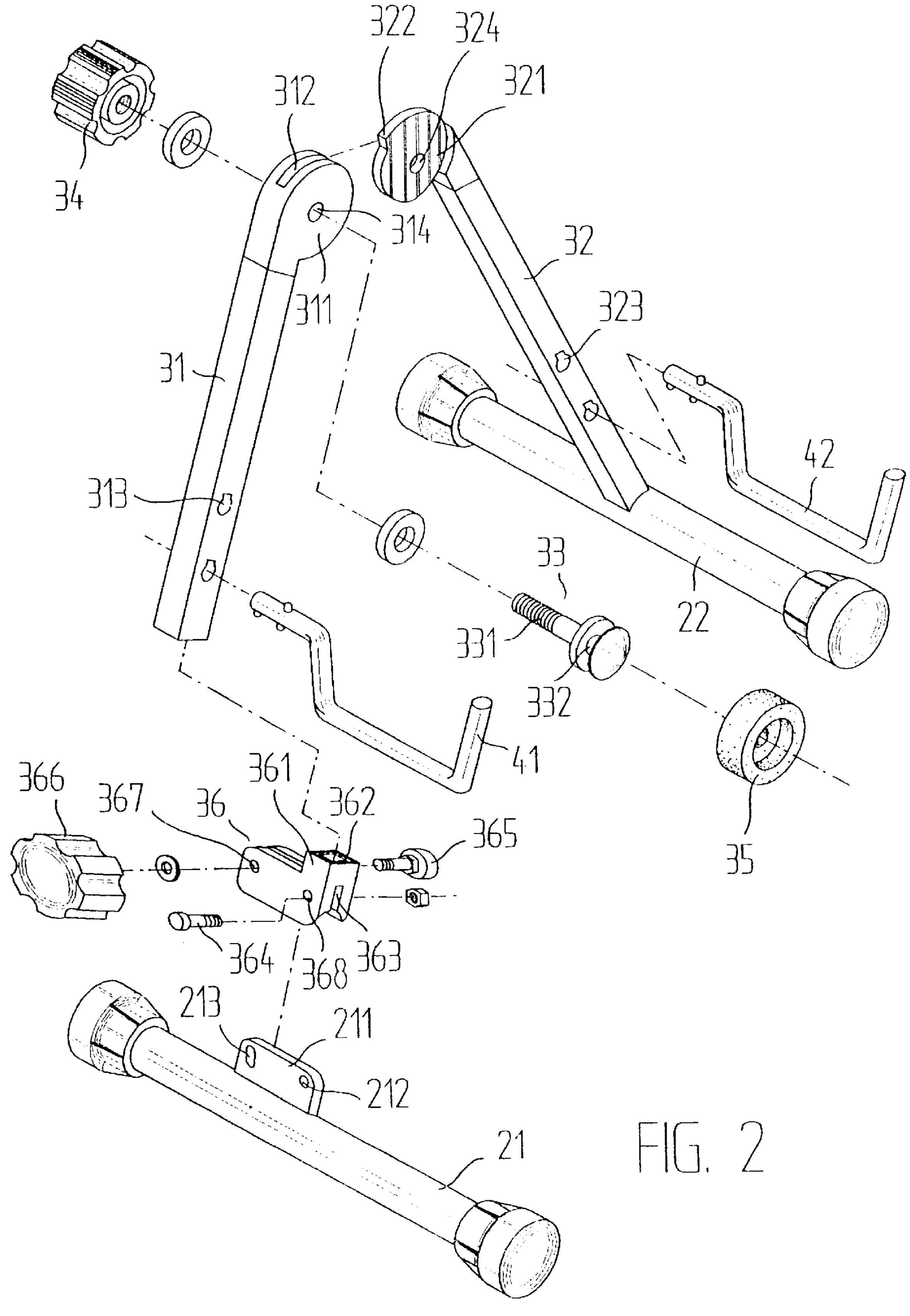
FIG. 2 is a perspective exploded view of a musical instrument stand of a preferred embodiment in accordance with the invention.
Figure 3:
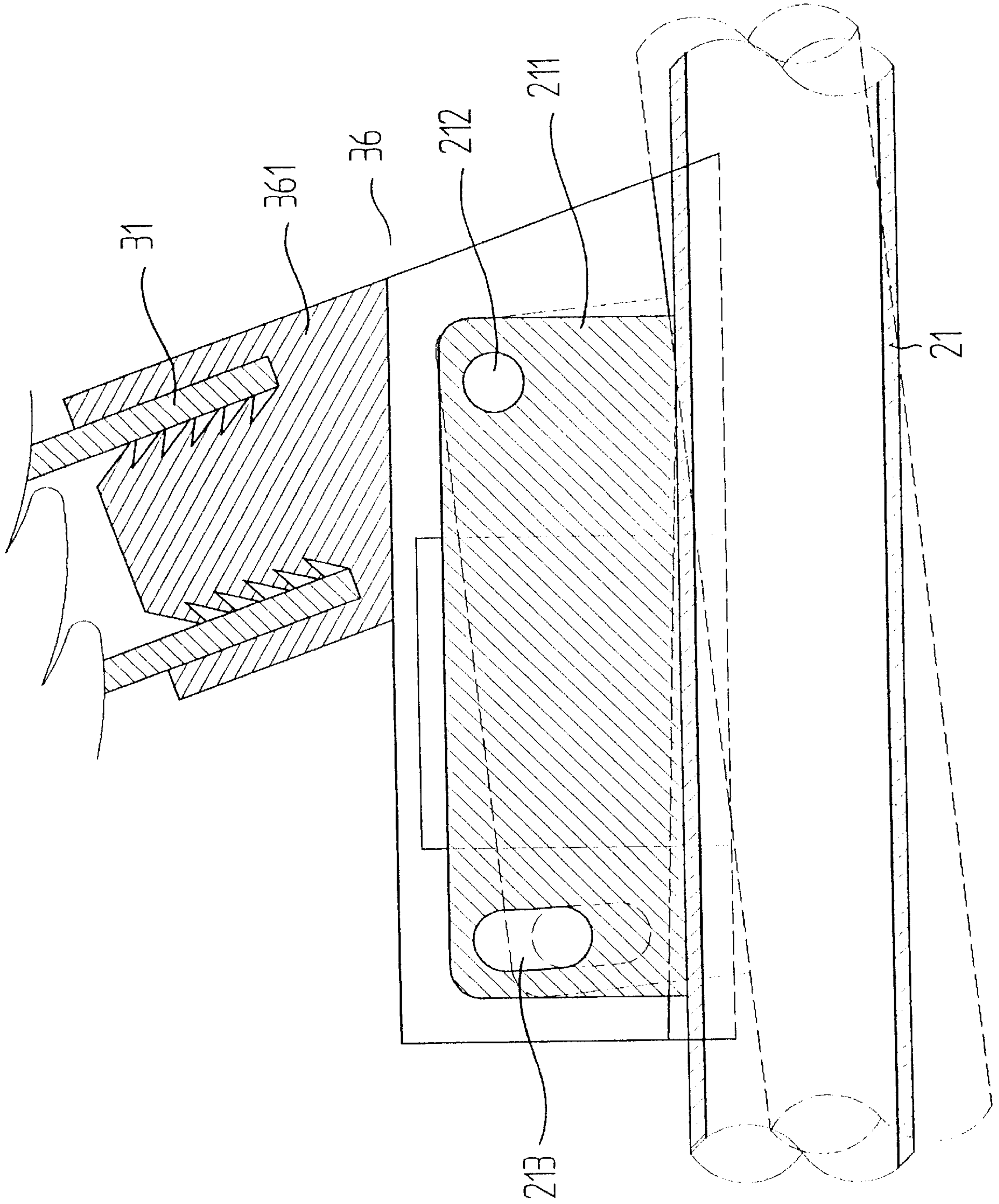
FIG. 3 is a schematic sectional view illustrating a lug of a first base rod engaging with a balance seat.
Figure 4:
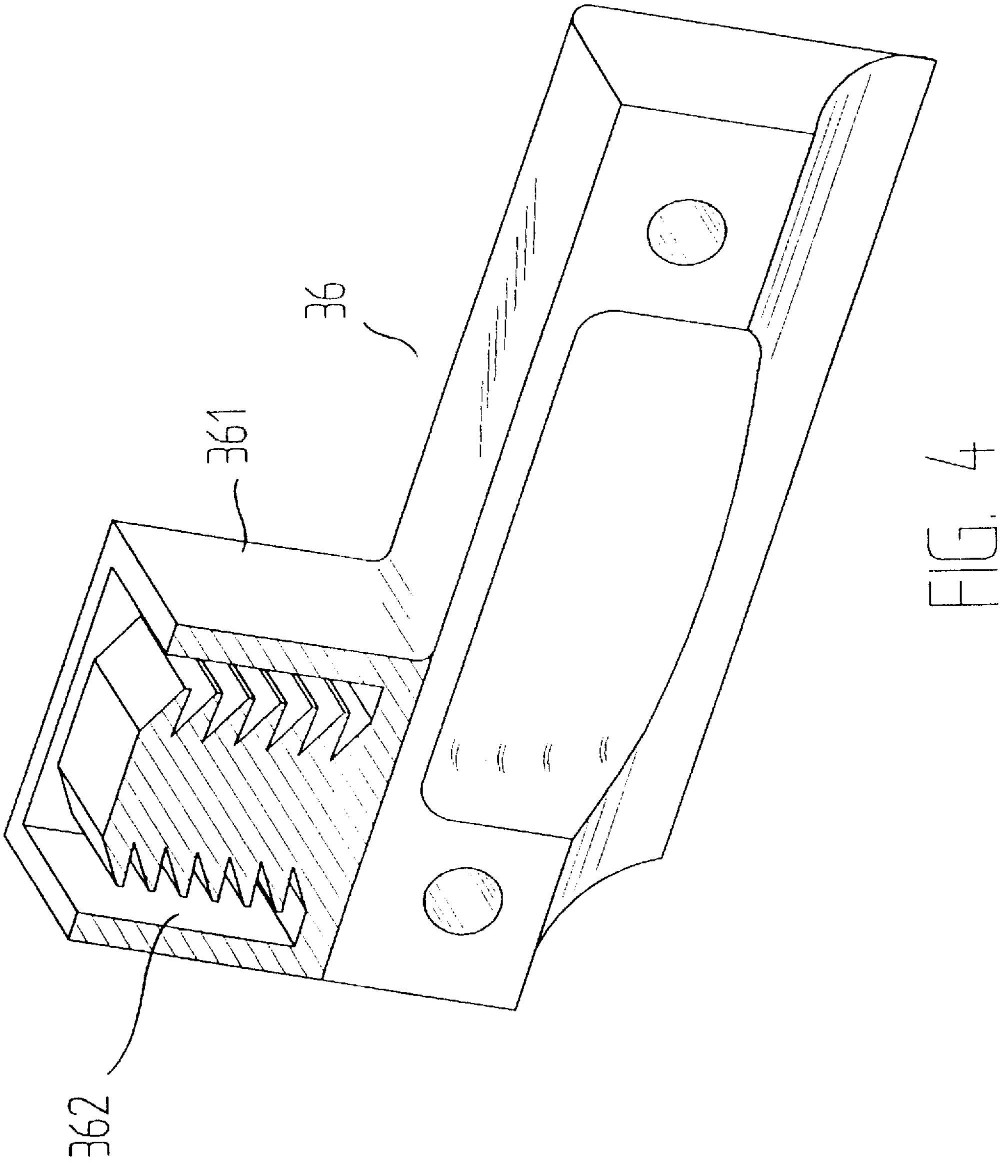
FIG. 4 is a partially sectional view of a balance seat.

Referring to FIGS. 1 to 4, a musical instrument stand comprises a first hollow plate 31, a second hollow plate 32, a first base rod 21, a second base rod 22, an adjustment knob 366, a balance seat 36, an annular cushion 35, a screw rod 33, and a swivel knob 34. A lug 211 is disposed on the first base rod 21. The lug 211 has a round hole 212 and an oblong hole 213. The balance seat 36 has a lateral post 361, a channel 363 receiving the lug 211, a groove 362 receiving a lower end of the first hollow plate 31, a first through aperture 367 matching the oblong hole 213, and a second through aperture 368 matching the round hole 212. A positioning bolt 365 passes through the first through aperture 367 and the oblong hole 213 to fasten the adjustment knob 366 and the balance seat 36 together. A screw 364 passes through the second through aperture 368 and the round hole 212 to fasten the lug 211 and the balance seat 36 together. The second hollow plate 32 is disposed on the second base rod 22. A first undulated bracket 41 is disposed on the first hollow plate 31. A second undulated bracket 42 is disposed on the second hollow plate 32. The first hollow plate 31 has an upper lobe end 311. The upper lobe end 311 has a slot 312 and a through hole 314. The second hollow plate 32 has an upper disk end 321. The upper disk end 321 has a center hole 324 and a periphery flange 322. The upper disk end 321 is inserted in the slot 312. A screw rod 33 has a head portion 332 and a threaded portion 331 inserted through the through hole 314, the center hole 324, and the swivel knob 34. The first hollow plate 31 has a plurality of first positioning holes 313. The second hollow plate 32 has a plurality of second positioning holes 323.

The periphery flange 322 can confine the extension angle between the first hollow plate 31 and the second hollow plate 32.

An annular cushion 35 encloses the head portion 332 of the screw rod 33.

Figure 5:
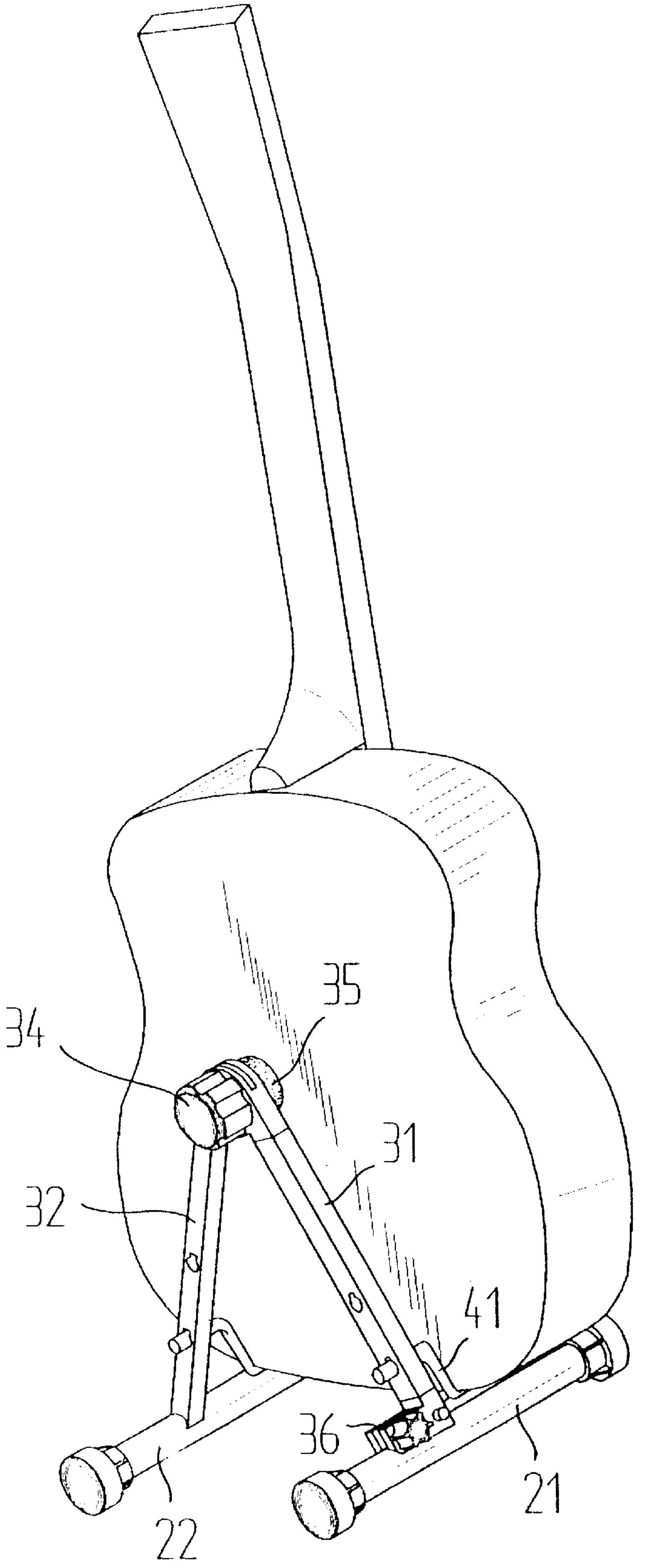
FIG. 5 is a schematic view illustrating a musical instrument placed on a musical instrument stand of a preferred embodiment in accordance with the invention.
Figure 6:
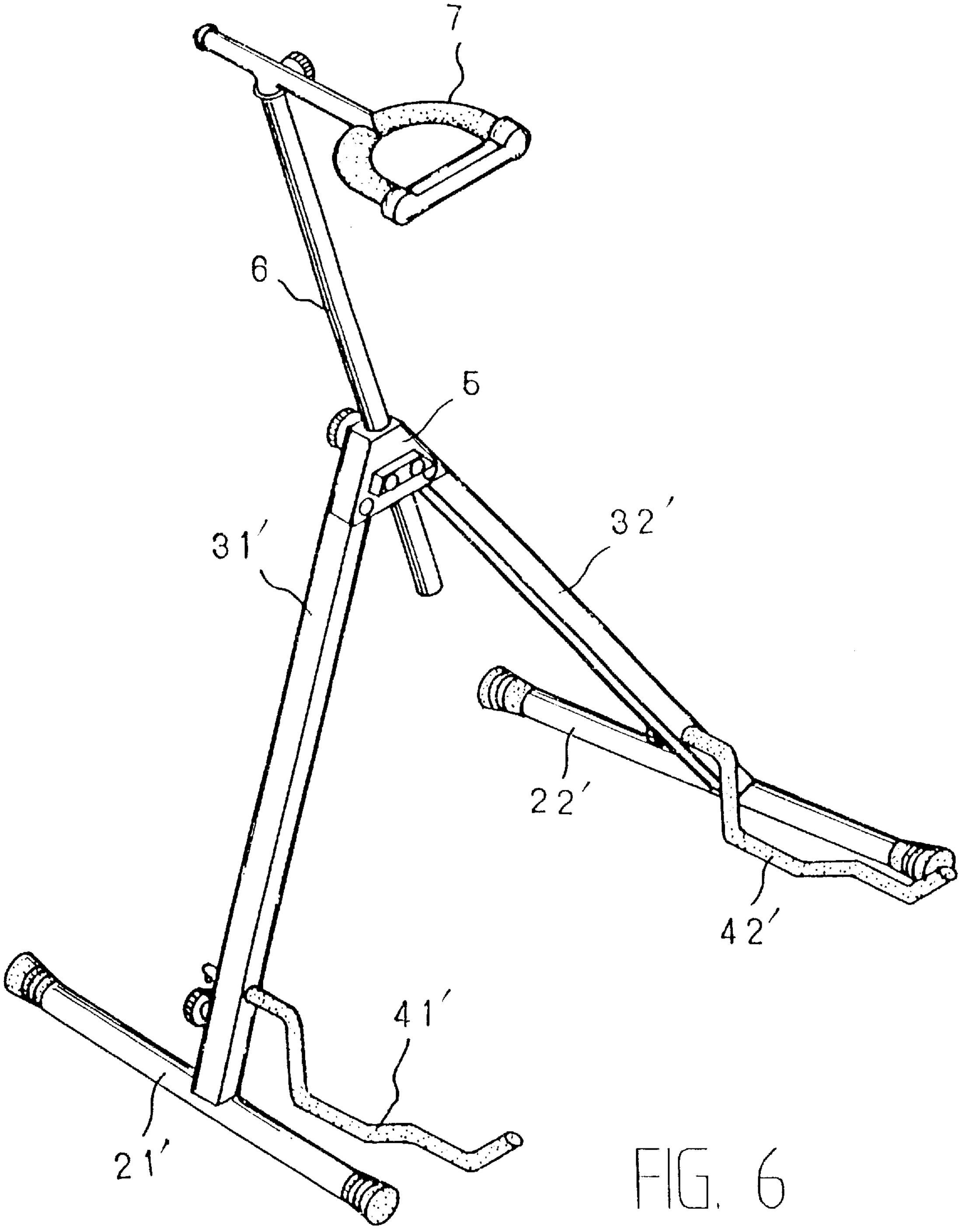
FIG. 6 PRIOR ART
FIG. 6 is a perspective assembly view of a musical instrument stand of the prior art.

Referring to FIG. 5, a guitar is placed on the musical instrument stand.

The invention is not limited to the above embodiment but various modification thereof may be made. Further, various changes in form and detail may be made without departing from the scope of the invention.

I claim:

1. A musical instrument stand comprising:

a first hollow plate, a second hollow plate, a first base rod, a second base rod, an adjustment knob, a balance seat, an annular cushion, a screw rod, and a swivel knob, a lug disposed on the first base rod, the lug having a round hole and an oblong hole, the balance seat having a lateral post, a channel receiving the lug, a groove receiving a lower end of the first hollow plate, a first through aperture matching the oblong hole, and a second through aperture matching the round hole, a positioning bolt passing through the first through aperture and the oblong hole to fasten the adjustment knob and the balance seat together, a screw passing through the second through aperture and the round hole to fasten the lug and the balance seat together, the second hollow plate disposed on the second base rod, a first undulated bracket disposed on the first hollow plate, a second undulated bracket disposed on the second hollow plate, the first hollow plate having an upper lobe end, the upper lobe end having a slot and a through hole, the second hollow plate having an upper disk end, the upper disk end having a center hole and a periphery flange, the upper disk end inserted in the slot, a screw rod having a head portion and a threaded portion inserted through the through hole, the center hole, and the swivel knob.

2. A musical instrument stand as claimed in claim 1, wherein an annular cushion encloses the head portion of the screw rod.

3. A musical instrument stand as claimed in claim 1, wherein the first hollow plate has a plurality of positioning holes.

4. A musical instrument stand as claimed in claim 1, wherein the second hollow plate has a plurality of positioning holes.

* * * * *